United States Patent [19]
Thompson

[11] Patent Number: 5,856,973
[45] Date of Patent: *Jan. 5, 1999

[54] DATA MULTIPLEXING IN MPEG SERVER TO DECODER SYSTEMS

[76] Inventor: Kenneth M. Thompson, 1169 St. Andrews Cir., Atlanta, Ga. 30338-3201

[*] Notice: This patent issued on a continued prosecution application filed under 37 CFR 1.53(d), and is subject to the twenty year patent term provisions of 35 U.S.C. 154(a)(2).

[21] Appl. No.: 711,831

[22] Filed: Sep. 10, 1996

[51] Int. Cl.⁶ .............................. H04J 3/00; H04N 7/08
[52] U.S. Cl. ................. 370/389; 370/401; 370/468; 370/498; 370/521; 348/461; 348/474
[58] Field of Search ........................... 370/487, 490, 370/498, 500, 503, 505, 506, 521, 527, 528, 529, 535, 538, 542, 543, 389, 401, 468, 474; 395/2.91, 2.92, 2.94; 348/384, 403, 407, 423, 461, 473, 474

[56] References Cited
U.S. PATENT DOCUMENTS

| | | | |
|---|---|---|---|
| 5,481,543 | 1/1996 | Velman | 348/465 |
| 5,515,107 | 5/1996 | Chiang et al. | 348/473 |
| 5,521,918 | 5/1996 | Kim | 370/428 |
| 5,537,148 | 7/1996 | Fujinami | 348/473 |
| 5,559,999 | 9/1996 | Maturi et al. | 395/550 |
| 5,598,352 | 1/1997 | Rosenau et al. | 364/514 A |

*Primary Examiner*—Chi H. Pham
*Assistant Examiner*—Ricky Q. Ngo
*Attorney, Agent, or Firm*—Sawyer & Associates

[57] ABSTRACT

A method and device for communicating private application data, along with audio data (e.g., MPEG-2 encoded audio data) and video data (e.g., MPEG-2 encoded video data), from a first location to a second location. The private application data is either stuffed into a header portion of packets of encoded audio or video data, or packetized and multiplexed with packets of encoded audio or video data. The multiplexed packets form a packet stream which is communicated to the second location.

21 Claims, 8 Drawing Sheets

DATA MULTIPLEXING IN MPEG SERVER TO DECODER SYSTEMS

BACKGROUND OF THE INVENTION a. Field of the Invention

The present invention concerns a method and apparatus for combining audio, video, and private application(s) data for communication and, in particular, concerns a method and apparatus for inserting private application(s) data, such as text and graphics overlays and gaming data, for example, onto an MPEG (Motion Pictures Experts Group) or MPEG-2 transport stream including packets carrying MPEG encoded video and audio data. In particular, the present invention concerns a method and apparatus for inserting private application(s) data onto an MPEG or MPEG-2 transport stream such that:

(i) the private application(s) data is synchronized with packets of encoded video data on the MPEG or MPEG-2 transport stream; and/or (ii) the format of packets defining the transport stream can be dynamically adjusted based on the bandwidth required to communicate the private application(s) data.

b. Related Art

The International Organisation for Standardisation (or the Organisation Internationale De Normalisation) (hereinafter referred to as "the ISO/IEC") has produced a standard for the coding of moving pictures and associated audio. This standard is set forth in four documents. The document ISO/IEC 13818-1 (systems) specifies the system coding of the specification. It defines a multiplexed structure for combining audio and video data and means of representing the timing information needed to replay synchronized sequences in real-time. The document ISO/IEC 13818-2 (video) specifies the coded representation of video data and the decoding process required to reconstruct pictures. The document ISO/IEC 13818-3 (audio) specifies the coded representation of audio data and the decoding process required to reconstruct the audio data. Lastly, the document ISO/IEC 13818-4 (conformance) specifies procedures for determining the characteristics of coded bitstreams and for testing compliance with the requirements set forth in the ISO/IEC documents 13818-1, 13818-2, and 13818-3. These four documents, hereinafter referred to, collectively, as "the MPEG-2 standard", are incorporated herein by reference.

A bit stream, multiplexed in accordance with the MPEG-2 standard, is either a "transport stream" or a "program stream". Both program and transport streams are constructed from "packetized elementary stream" (or PES) packets and packets containing other necessary information. A "packetized elementary stream" (or PES) packet is a data structure used to carry "elementary stream data". An "elementary stream" is a generic term for one of (a) coded video, (b) coded audio, or (c) other coded bit streams carried in a sequence of PES packets with one and only stream ID. Both program and transport streams support multiplexing of video and audio compressed streams from one program with a common time base.

FIG. 7 illustrates the packetizing of compressed video data 706 of a video sequence 702 into a stream of PES packets 708, and then, into a stream of transport stream packets 712. Specifically, a video sequence 702 includes various headers 704 and associated compressed video data 706. The video sequence 702 is parsed into variable length segments, each having an associated PES packet header 710 to form a PES packet stream 708. The PES packet stream 708 is then parsed into segments, each of which is provided with a transport stream header 714 to form a transport stream 712. Each transport stream packet of the transport stream 712 is 188 bytes in length.

Transport streams permit one or more programs with one or more independent time bases to be combined into a single stream. Transport streams are useful in instances where data storage and/or transport means are lossy or noisy. The rate of transport streams, and their constituent packetized elementary streams (PESs) may be fixed or variable. This rate is defined by values and locations of program clock reference (or PCR) fields within the transport stream.

Although the syntax of the transport stream is described in the MPEG-2 standard, the fields of the transport stream pertaining to the present invention will be described below with reference to FIG. 3 for the reader's convenience. As shown in FIG. 3, a transport packet stream 300 includes one or more 188 byte packets, each of the packets having a header 302 and an associated payload 304. Each header 302 includes an eight (8) bit synch byte field 306, a one (1) bit transport error indicator field 308, a one (1) bit payload unit start indicator field 310, a one (1) bit transport priority field 312, a thirteen (13) bit packet identifier (or PID) field 314, a two (2) bit transport scrambling control field 316, a two (2) bit adaptation field control field 318, a four (4) bit continuity counter field 320, and an adaptation field 322. Each of these fields is described in the MPEG-2 standard. However, for the reader's convenience, the fields particularly relevant to the present invention are described below.

First, the synch byte 306 has a value of "01000111" and identifies the start of a 188 byte packet. The PID field 314 indicates the type of data stored in the payload 304 of the 188 byte packet. Certain PID values are reserved. For example, PID values 0x00010 through 0x1FFE may be assigned as a ProgrammapPID. The program map provides mappings between program numbers and the elementary streams that comprise them. The program map table is the complete collection of all program definitions for a transport stream. The program map shall be transmitted in packets, the PID values of which are privately selected (i.e., not specified by the ISO/IEC).

As shown in FIG. 3, the adaptation field 322 includes an eight (8) bit adaptation field length field 324, a one (1) bit discontinuity indicator field 326, a one (1) bit random access indicator field 328, a one (1) bit elementary stream priority indicator field (330), a five (5) bit flag field 332, optional fields 334 and stuffing bytes 336.

As is further shown in FIG. 3, the optional fields 334 include a 42 bit program reference clock (or PRC) field, 338, a 42 bit original program reference clock (or OPCR) field 340, an eight (8) bit splice countdown field 342, an eight (8) bit transport private data length field 344, a transport private data field 346, an eight (8) bit adaptation field extension length field 348, a three (3) bit flag field 350, and optional fields 352. Each of these fields is described in the MPEG-2 standard. However, for the reader's convenience, the fields particularly relevant to the present invention are described below.

First, the 42 bit program clock reference (or PCR) field 338 and the 42 bit original program clock reference (or OPCR) field 340 are time stamps in the transport stream from which timing of a downstream decoder is derived. The eight (8) bit transport private data length field 344 describes the length (in bytes) of the adjacent transport private data field 346. The contents of the transport private data field 346 are privately determined (i.e., not specified by the ISO/IEC).

As is also shown in FIG. 3, the optional fields 352 include a one (1) bit legal time window valid flag field 354, a fifteen

(15) bit legal time window offset field 356, two (2) undefined bits, a 22 bit piecewise rate field 358, a four (4) bit splice type field 366, and a 33 bit decoding time stamp next access unit field 362. A description of these fields is not necessary for understanding the present invention.

The payloads 304 of one or more transport stream packets may carry "packetized elementary stream" (or PES) packets 800. To reiterate, a "packetized elementary stream" (or PES) packet 800 is a data structure used to carry "elementary stream data" and an "elementary stream" is a generic term for one of (a) coded video, (b) coded audio, or (c) other coded bit streams carried in a sequence of PES packets with one and only stream ID.

FIG. 8 is a diagram which illustrates the syntax of a PES packet 800. As FIG. 8 shows, a PES packet 800 includes the PES packet header 710 comprising a 24 bit start code prefix field 802, an eight (8) bit stream identifier field 804, a sixteen (16) bit PES packet length field 806, an optional PES header 808; and the payload or data section 706. Each of these fields is described in the MPEG-2 standard.

The MPEG-2 standard focuses on the encoding and transport of video and audio data. In general, the MPEG-2 standard uses compression algorithms such that video and audio data may be more efficiently stored and communicated. FIG. 4 is a block schematic showing the steps of encoding, communicating (from location 440 to location 450), and decoding video and audio data in accordance with the MPEG-2 standard.

As shown in FIG. 4, at a first location 440, video data is provided to a video encoder 402 which encodes the video data in accordance with the MPEG-2 standard (specified in the document ISO/IEC 13818-2 (video), which is incorporated herein by reference). The video encoder 402 provides encoded video 404 to a packetizer 406 which packetizes the encoded video 404. The packetized encoded video 408 provided by the packetizer 406 is then provided to a first input of at least one of a program stream multiplexer 410 and a transport stream multiplexer 412. For the purposes of understanding the present invention, it can be assumed that program streams are not generated.

Similarly, at the first location 440, audio data is provided to an audio encoder 414 which encodes the audio data in accordance with the MPEG-2 standard (specified in the document ISO/IEC 13818-3 (audio), which is incorporated herein by reference). The audio encoder 414 provides encoded audio 416 to a packetizer 418 which packetizes the encoded audio 416. The packetized encoded audio 420 provided by the packetizer 418 is then provided to a second input of at least one of the program stream multiplexer 410 and the transport stream multiplexer 412.

The transport stream multiplexer 412 multiplexes the encoded audio and video packets and transmits the resulting multiplexed stream to a second location 450 via communications link 422. At the second location 450, on a remote end of the communications link 422, a transport stream demultiplexer 424 receives the multiplexed transport stream. Based on the packet identification (or PID) number 314 of a particular packet, the transport stream demultiplexer 424 separates the encoded audio and video packets and provides the video packets to a video decoder 430 via link 428 and the audio packets to an audio decoder 434 via link 432. The transport stream demultiplexer 424 also provides timing information to a clock control unit 426. The clock control unit 426 provides timing outputs to the both the video decoder 430 and the audio decoder 434 based on the timing information provided by the transport stream demultiplexer 424 (e.g., based on the values of the PCR fields 338). The video decoder 430 provides video data which corresponds to the video data originally provided to the video encoder 402. Similarly, the audio decoder 434 provides audio data which corresponds to the audio data originally provided to the audio encoder 414.

In some instances, communicating private application data from the first location 440, at the near end of link 422, to the second location 450, at the far end of the link 422, is desired. This private application data may, for example, include graphics and text screens which are to overlay the video data, gaming data associated with the video data, or pricing and ordering information related to the video data, for example. Some private application data will not need to be synchronized with the video data. For example, private application data corresponding to real-time stock ticker information including financial news and analysis can be overlaid over a television program without synchronization. On the other hand, some private application data must be synchronized with the video and audio data. For example, private application data corresponding to pricing and ordering information for a sequence of products to be overlaid over a home shopping program displaying a sequence of various products must be synchronized with the video of the products such that the pricing and ordering information corresponds to the appropriate product being displayed.

Known MPEG systems do not specify how to communicate such private application data from a first location 440 to a second location 450. Thus, a need exists for a method and device for communicating such private application data. Such a method or device should use the existing communication link 422, if possible, so that such data can be transmitted with the packetized MPEG video and audio data. Moreover, such a method or device should permit the private application data to be synchronized with the decoded MPEG video and audio data. Furthermore, such a method or device should conserve bandwidth and prevent buffers storing MPEG packets from underflowing (in which case the same frame of video may be played more than once) or overflowing (in which case packets are lost) Finally, such a method and device should permit the communication of more than one type of private application data.

SUMMARY OF THE INVENTION

The present invention meets the above described needs by providing a method for communicating private application data, along with audio and video data, from a source location to a destination location, the method including steps of:

(a) encoding the audio data in accordance with an audio compression algorithm to produce encoded audio data;

(b) encoding the video data in accordance with a video compression algorithm to produce encoded video data;

(c) packetizing the encoded audio data to produce packets of encoded audio data, each of the packets of encoded audio data having a header portion and a payload portion, each header portion of the audio packets having a fixed area for accommodating private application data;

(d) packetizing the encoded video data to produce packets of encoded video data, each of the packets of encoded video data having a header portion and a payload portion, each header portion of the video packets having a fixed area for accommodating private application data;

(e) inserting the private application data into the fixed areas of the headers of the packets of encoded audio data and packets of encoded video data to produce stuffed audio and video packets;

(f) multiplexing the stuffed audio and video packets to form a packet stream; and (g) transmitting the packet stream from the source location to the destination location.

At the destination location, the method includes steps of:

(a) extracting private application data from the stuffed audio and video packets of the transmitted packet stream;

(b) demultiplexing the transmitted packet stream to separate the packets of encoded audio data from the packets of encoded video data;

(c) decoding the payload portion of the packets of audio encoded data to form audio data; and (d) decoding the payload portion of the packets of encoded video data to form video data. The extracted private application data may then be provided to a private application process.

The steps of encoding the audio and video data to produce encoded audio and video data are preferably performed in accordance with the MPEG-2 standard. The packet stream is preferably an MPEG-2 transport stream.

If the private data is video or graphic data, the method may further include steps of processing the private application data to form a screen overlay and combining the screen overlay with the decoded video data.

The present invention also provides a second method for communicating private application data, along with audio and video data, from a source location to a destination location, the second method includes steps of:

(a) encoding the audio data in accordance with an audio compression algorithm to produce encoded audio data;

(b) encoding the video data in accordance with a video compression algorithm to produce encoded video data;

(c) packetizing the encoded audio data to produce packets of encoded audio data, each of the packets of encoded audio data having a header which includes a first packet identification number;

(d) packetizing the encoded video data to produce packets of encoded video data, each of the packets of encoded video data having a header which includes a second packet identification number;

(e) packetizing the private application data to produce packets of private application data, each of the packets of private application data having a header which includes a third packet identification number;

(f) multiplexing the packets of private application data, encoded audio data, and encoded video data to produce a packet stream; and (g) transmitting the packet stream from the source location to the destination location.

At the destination location, the second method of includes further steps of:

(h) demultiplexing the transmitted packet stream to separate the packets of encoded audio data, packets of encoded video data, and packets of private data;

(i) decoding the payload data of the packets of encoded audio data to form audio data; and (j) decoding the payload data of the packets of encoded video data to form video data. The private application data located in the payload of the packets of private application data may then be provided to a private application process.

In each of the methods, the steps of encoding the audio and video data to produce encoded audio and video data are preferably performed in accordance with the MPEG-2 standard. The packet stream is preferably an MPEG-2 transport stream.

In each of the methods, if the private data is video or graphic data, the method may further include steps of processing the private application data to form a screen overlay and combining the screen overlay with the decoded video data.

The first method may be implemented on a device for communicating private application data, along with audio and video data, from a source location to a destination location. Such a device includes an audio encoder, an audio packetizer, a video encoder, a video packetizer, and a stream server. The audio encoder has an input accepting audio data and an output providing compressed audio data. The audio packetizer has an input, coupled with the output of the audio encoder, and an output providing packets of encoded audio data. Each of the packets of encoded audio data have a header portion and a payload portion. Each header portion has a fixed area for accommodating private application data. The video encoder has an input accepting video data and an output providing compressed video data. The video packetizer has an input, coupled with the output of the video encoder, and an output providing packets of encoded video data. Each of the packets of encoded video data has a header portion and a payload portion. Each header portion has a fixed area for accommodating private application data. The stream server has a first input coupled with the output of the audio packetizer, a second input coupled with the output of the video packetizer, a third input provided with the private application data, and an output. The stream server inserts private application data provided at its first input into the fixed areas of the headers of the packets of encoded audio data and of the packets of encoded video data to form stuffed audio and video packets, respectively. The stream server then multiplexes the stuffed audio and video packets to form a packet stream and provides the packet stream to its output. The device may also include a communications link having a first end, at the source location, coupled with the output of the stream server, and a second end at the destination location.

At the destination location, the device of the present invention includes a stream demultiplexer, a video decoder, an audio decoder, and a private data processor. The stream demultiplexer has an input coupled with the second end of the communications link, a first output, a second output, and a third output. The stream demultiplexer extracts the private application data from the stuffed audio and video packets, demultiplexes the packet stream to separate the packets of encoded audio data from the packets of encoded video data, and provides the packets of encoded audio data to its first output, the packets of encoded video data to its second output, and the private application data to its third output. The audio decoder has an input coupled to with the first output of the stream demultiplexer, and an output at which it provides audio data. The video decoder has an input coupled with the second output of the stream demultiplexer, and an output at which it provides video data. The private application processor has an input is coupled with the third output of the stream demultiplexer.

The audio encoder is preferably an MPEG-2 audio encoder and the video encoder is preferably an MPEG-2 video encoder. The packet stream formed by the stream server is preferably an MPEG-2 transport stream.

If the private data is graphic or video data, the private application processor has an output which provides private video screen data and the device of the present invention further includes a screen combining circuit. The screen combining circuit has a first input coupled with the output of the video decoder, a second input coupled with the output of the private application processor, and an output at which it provides a video screen including the video data and the private video screen data.

The second method may be implemented on a device for communicating private application data, along with audio and video data, from a source location to a destination location. The device includes an audio encoder, a video encoder, packetizers, and a stream server. The audio encoder has an input provided with audio data and an output. The audio encoder encodes the audio data provided at its input in accordance with an audio compression algorithm to produce encoded audio data, and provides the encoded audio data to its output. The video encoder has an input provided with video data and an output. The video encoder encodes the video data provided at its input in accordance with a video compression algorithm to produce encoded video data, and provides the encoded video data to its output. A first packetizer has an input coupled with the output of the audio encoder, and an output. The first packetizer produces packets of encoded audio data. Each of the packets of encoded audio data has a header which includes a first packet identification number. The first packetizer provides the packets of encoded audio data to its output. A second packetizer has an input coupled with the output of the video encoder, and an output. The second packetizer produces packets of encoded video data. Each of the packets of encoded video data has a header which includes a second packet identification number. The second packetizer provides the packets of encoded video data to its output. A third packetizer has an input provided with the private application data, and an output. The third packetizer packetizes the private application data provided at its input to produce packets of private application data. Each of the packets of private application data has a header which includes a third packet identification number. The third packetizer provides the packets of private application data to its output. The stream server has a first input coupled with the output of the first packetizer, a second input coupled with the output of the second packetizer, a third input coupled with the output of the third packetizer, and an output. The stream server multiplexes the packets of private application data, encoded audio data, and encoded video data to produce a packet stream, and provides the packet stream to its output. A communications link having a first end, at the source location, coupled with the output of the stream server, and a second end at the destination location, may also be provided. The communications link transmits the packet stream from the source location to the destination location.

At the destination location the device further includes a demultiplexer, an audio decoder, and a video decoder. The demultiplexer has an input coupled with the second end of the communications link, a first output, a second output, and a third output. The demultiplexer demultiplexes, based on the first, second, and third packet identification numbers, the transmitted packet stream to separate the packets of encoded audio data, packets of encoded video data, and a private data packets, and provides the audio packets to its first output, the video packets to its second output, and the private data packets to its third output. The audio decoder has an input coupled with the first output of the demultiplexer, and an output. The audio decoder decodes the payload data of the packets of encoded audio data to form audio data, and provides the audio data to its output. The video decoder has an input coupled with the second output of the demultiplexer, and an output. The video decoder decodes the payload data of the packets of encoded video data to form video data, and provides the video data to its output.

At the destination location, the device preferably further includes a private application processor having an input coupled with the third output of the demultiplexer whereby it receives private application data located in the payload of the private application data packet.

The audio encoder is preferably an MPEG-2 audio encoder and the video encoder is preferably an MPEG-2 video encoder.

If the private data is graphic or video data, the device may further include a video combination circuit having a first input coupled with the output of the video decoder, a second input, and an output. The private application processor processes the private application data to form a screen overlay and provides the screen overlay to an output coupled with the second input of the video combination circuit. The video combination circuit combines the screen overlay provided at its second input with the video data provided at its first input.

DETAILED DESCRIPTION

Figure 1:
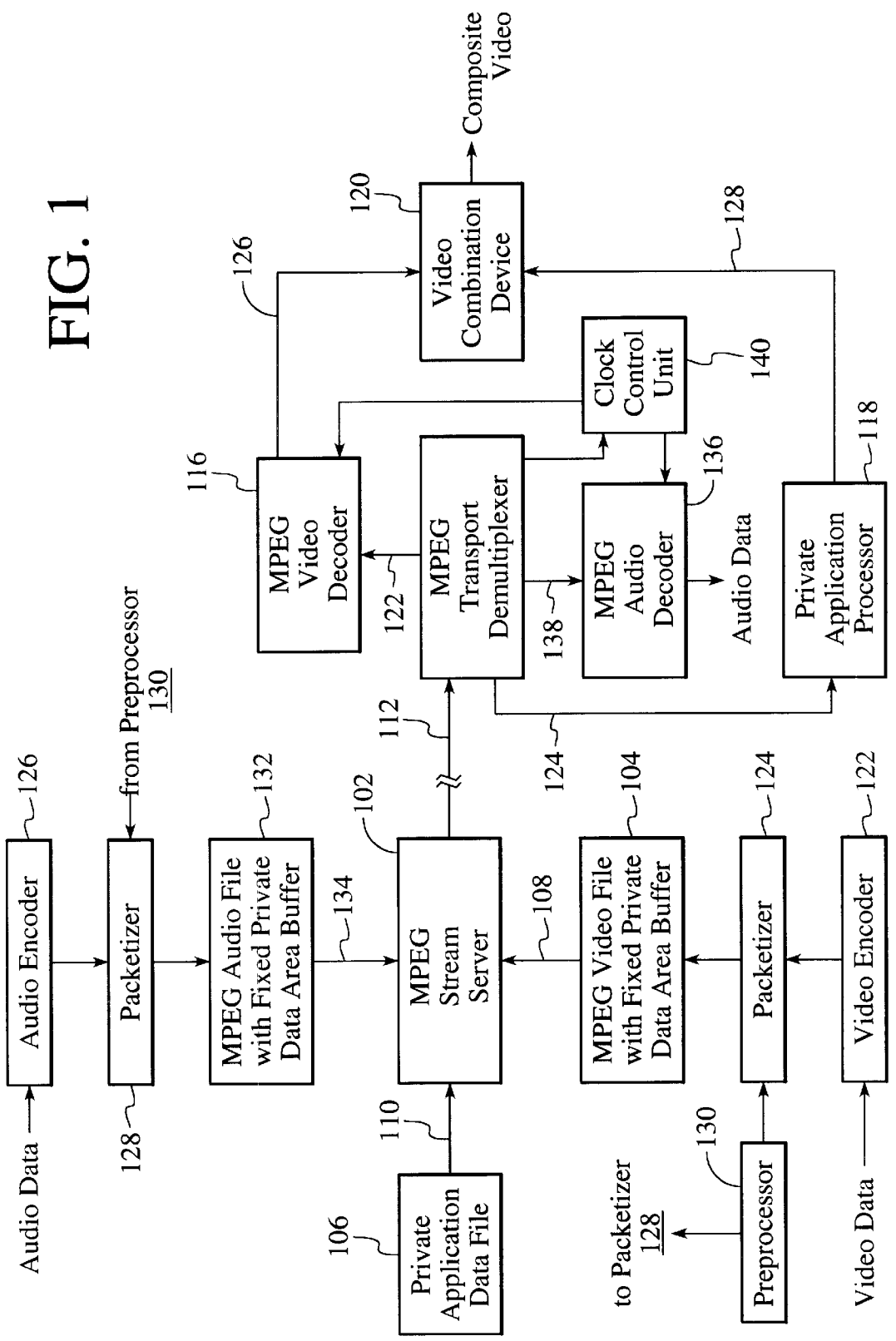
FIG. 1 is a high level block diagram of a first embodiment of the present invention.
Figure 4:
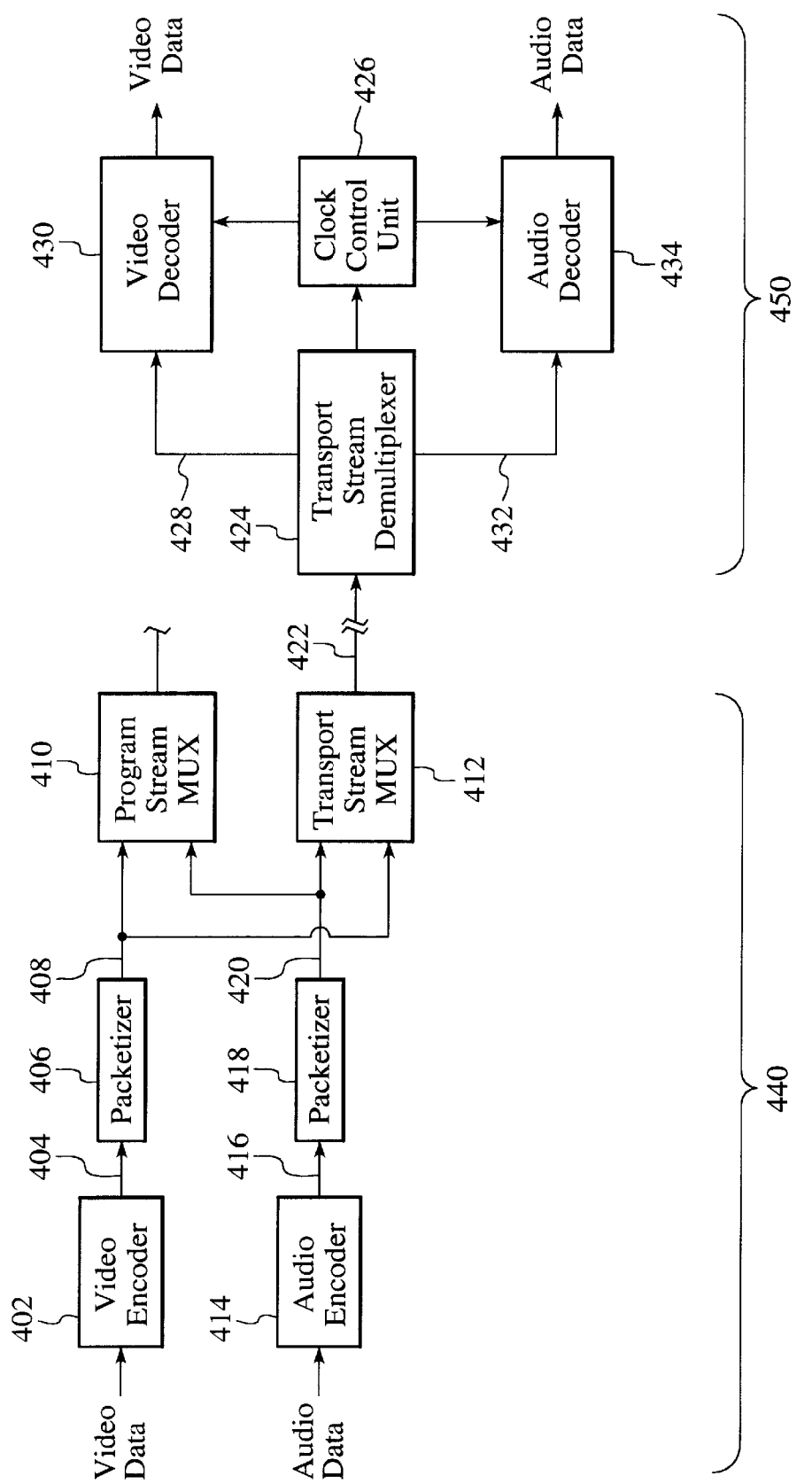
FIG. 4 is a high level block diagram of a system described in the MPEG-2 standard.

FIG. 1 is high level block diagram of the first embodiment of the present invention. As was the case with the device shown in FIG. 4, video and audio data is encoded, in accordance with the MPEG-2 standard, with a video encoder 122 and an audio encoder 126, respectively. The encoded video and audio data are provided to packetizers 124 and 128, respectively. A preprocessor 130 is also coupled with the packetizers 124 and 128. The preprocessor 130, inter alia, reserves a fixed space for the insertion of private application(s) data. The preprocessor 130 reserves this space by setting the transport private data length field 344 of the optional fields 334 of the adaptation field 322 of the headers 302 of the video and audio MPEG encoded packets. The preprocessor 130 may also prepare a packet having a PID map table which indicates the number of "elementary streams" to be included in the transport stream. The preprocessor 130 is preferably implemented as a microprocessor executing stored program instructions.

The preprocessed, packets of MPEG encoded audio and video data may be stored in storage device (not shown) and retrieved as files of MPEG packets having fixed length private data fields 346. Such files are shown as being stored in output devices (e.g., buffers) 104 and 132 respectively. The files of MPEG video packets stored in buffer 104 are provided to the MPEG stream server 102 via link 108 while the files of MPEG audio packets stored in buffer 132 are provided to the MPEG stream server 102 via link 134. Private application data 106 is also provided to the MPEG stream server 102, via link 110.

Figure 5:
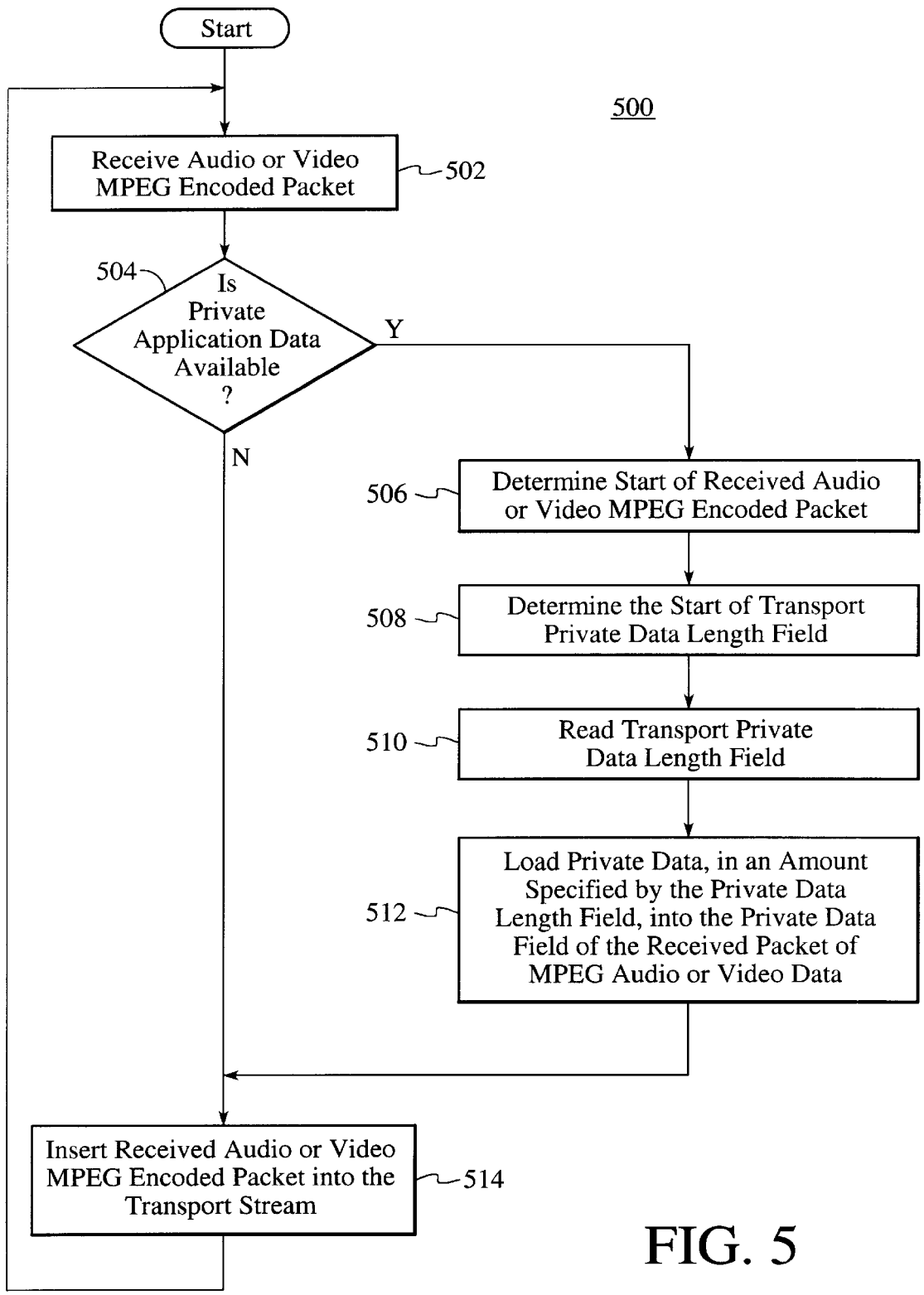
FIG. 5 is a flow diagram illustrating the operation of the MPEG stream server of the first embodiment of the present invention.

The video stream server 102 inserts any available private application data from the private application data file, stored in buffer 106, into the transport private data field(s) 346 of the packets of MPEG audio and video data. Recall that the length of the transport private data field 346 was fixed in preprocessing by inserting a fixed value into the transport private data length fields 344. The operation of the MPEG stream server 102 is described in more detail with reference to FIG. 5.

First, as shown in step 502, the MPEG stream server 102 receives audio and video MPEG encoded packets on links 134 and 108, respectively. The MPEG stream server 102 multiplexes the audio and video MPEG encoded packets based on a control signal (not shown). Next, as shown in step 504, the MPEG stream server 102 determines whether or not private application data is available at link 110. If no private application data is available, the received audio or video MPEG encoded packet is inserted into a transport stream which is provided on communications link 112. If, on the other hand, private application data is available at link 110, the MPEG stream server 102 performs the following operations.

Figure 3:
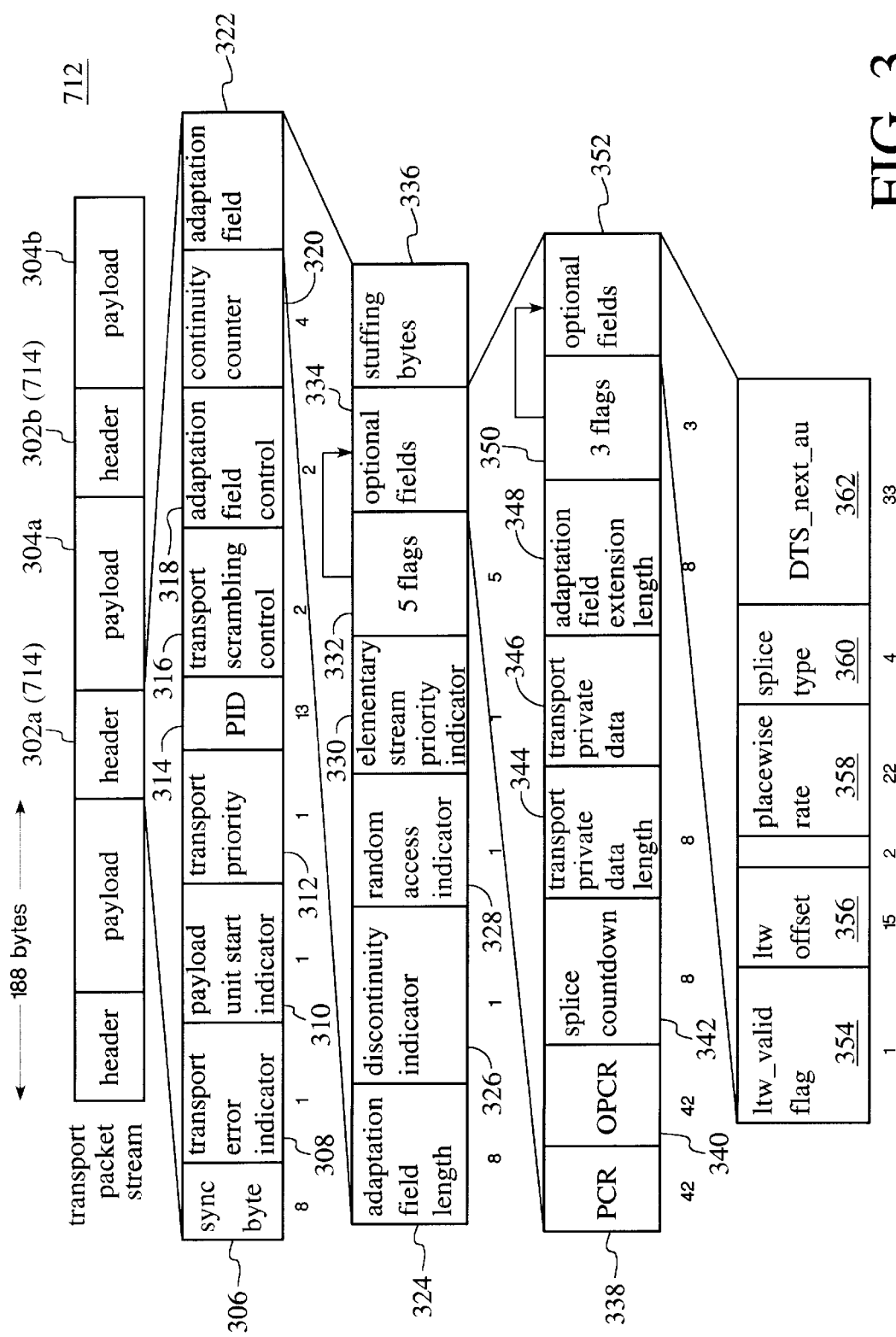
FIG. 3 illustrates the syntax of a transport stream in accordance with the MPEG-2 standard.

First, as shown in step 506, the MPEG stream server 102 determines the start of the received packet of MPEG audio or video data. Specifically, the MPEG stream server searches the received packet for the eight (8) bit sync byte 306. As mentioned in the background section, the sync byte 306 has a value of "01000111" and can be used to identify the start of a 188 byte packet. Next, as shown in step 508, the MPEG stream server 102 determines the start of the transport private data length field 344. Specifically, as can be seen in FIG. 3, there are 132 bits between the end of the eight (8) bit sync byte 306 and the transport private data length field 344. Next, as shown in step 510, the contents of the transport private data length field 344 are read out to determine the length of the transport private data field 346. Next, as shown in step 512, the available private application data is inserted, to the extent possible, into the transport private data field 346. Lastly, as shown in step 514, the resulting ("stuffed") packet is inserted into the transport stream.

The process, staring with step 502 is then repeated. In an alternative embodiment, if the preprocessor 130 always inserts the same fixed private data length value into the transport private data length field 344, steps 508 and 510 are not required. Instead, the start of the transport private data field 346 must only be determined. As can be seen from FIG. 3, this field follows the end of the sync byte 306 by 140 bits.

As the MPEG stream server 102 creates the transport stream, the transport stream is communicated to the far end of the link 112. The MPEG stream server 102 may be a work station (executing a program), such as a Silicon Graphics Challenge DM or Challenge S server for example. The MPEG stream server 102 should include (1) a processor (or processors) having adequate processing speed for processing the packets, for responding to the control signals, and for providing indicator signals (e.g., 100 MHz R4600 or 150- MHz R4400 CPUs); (2) an adequate amount of memory to store audio, video, and private application data being processed (e.g., 32 Mbytes to 2 Gbytes of RAM); and (3) a system bus having adequate throughput (e.g., 267 Mbytes to 1.2 Gbyte bandwidth). The MPEG stream server 102 should also include appropriate input/output ports and interfaces (e.g., Ethernet, SCSI, SCSI-2 fast and wide, FDDI, Hippi, and others) for accepting the packetized data and for transmitting the transport stream and for accepting and providing appropriate control and indicator signals. The link 112, over which the transport stream is communicated, may be sufficient to support the SCSI-2 fast and wide protocol, for example.

At the far end of the link 112, an MPEG transport demultiplexor 114:

(i) separates the audio and video packets from the transport stream based on the contents of the PID field 314 of each stream;

(ii) separates the private application data from the audio and video packets;

(iii) sends the private application data to a private data application processor 118 via link 124;

(iv) sends the MPEG video data to an MPEG video decoder 116, via link 122;

(v) sends the MPEG audio data to an MPEG audio decoder 136, via link 138; and (vi) sends timing data to a clock control unit 140. A control output of the clock control unit 140 controls the decoding of the video and audio data. The transport stream demultiplexor 114 may be an appropriately configured CL9110 device manufactured by C-Cube Microsystems for example.

The private application processor 118 may process the private application data into, for example, graphic and/or textural overlays for associated MPEG video or gaming data. The MPEG decoder 116 provides a first video signal to a first input of a video combination device 120 via line 126. This video data may be encoded into NTSC (National Television Standards Committee) format for example before it is provided to the video combination device 120. The private application processor 118 provides a second video signal, such as a textural overlay, to a second input of the video combination device 120 via line 128.

The video combination device 120 combines the video signals applied to its first and second inputs to form a composite video signal. The composite video signal, output by the video combination device 120, is then modulated with a carrier frequency and combined with other video channels onto a broadband video distribution network, for example.

Although the private application has been described as generating video and/or textural overlays, the private application may be unrelated to the video and audio data, except for the fact that it is being transferred from the same source location as the video and audio data, to the same destination location as the video and audio data.

The first embodiment of the present invention is advantageous for private applications requiring the private application data or private application output to be (or remain) synchronized with the video data. This is because the private application data is communicated within the packets of encoded video and audio data. Unfortunately, the first embodiment of the present invention has a number of limitations, particularly, for applications in which the private application data does not need to be synchronized with the video data.

First, the size of the transport private data field must be allocated within the packets of MPEG encoded video and audio data at the time of encoding. Therefore, enough space must be provided such that private application data having the maximum anticipated bandwidth can be accommodated in the packets of MPEG encoded audio and video data. Hence, bandwidth is wasted when private application data requiring less than the maximum anticipated bandwidth is to be inserted onto the transport stream.

Second, the private data PIDs must be assigned during the encoding process. This limits the number of different types of private data applications. Moreover, non-file sources, such as network connections or data bases for example, cannot be supported.

Further, since the MPEG stream server 102 has to insert the private application data within packets and since the MPEG transport demultiplexer 114 has to extract the private application data from the packets, both the MPEG stream server 102 and the MPEG transport demultiplexer 114 must partially decode the packets and perform additional processing. That is, the additional layer of encapsulation (i.e., the private application data is encapsulated within the audio and video MPEG packets) inherently requires more processing (e.g., decoding).

Figure 2:
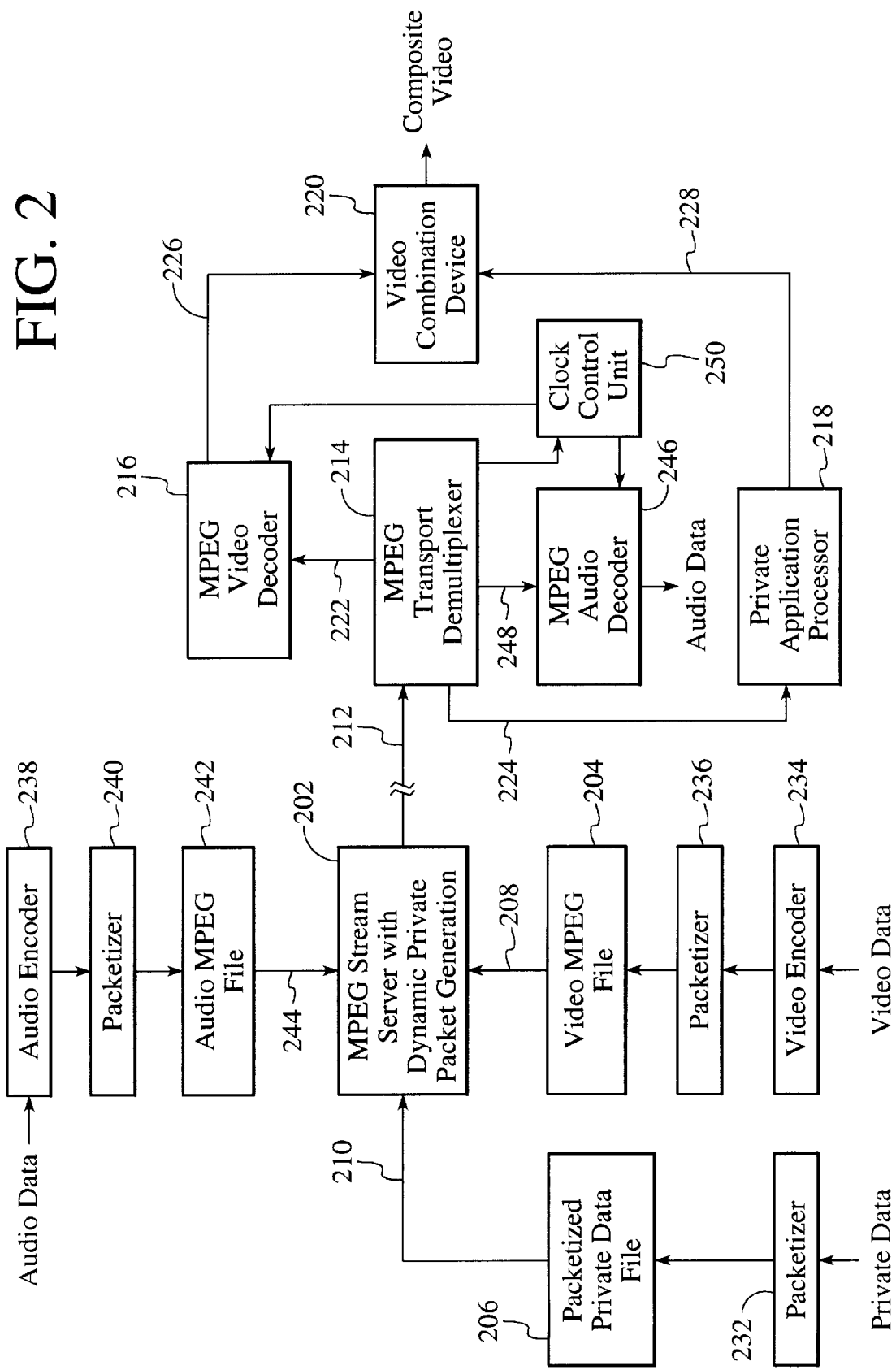
FIG. 2 is a high level block diagram of a second embodiment of the present invention.

The second embodiment of the present invention, shown in FIG. 2, overcomes the above described problems associated with the first embodiment of the present invention. Specifically, the second embodiment of the present invention:

(i) supports the transmission of private application data requiring a wide range of bandwidths without requiring space for the private application data to be pre-allocated within the packets of MPEG audio and video data;

(ii) allows the bandwidth of the private application data to be dynamically adjusted during the transmission of the transport stream; and (iii) permits different types of private application data, which may come from different sources, to be added to the same transport stream.

FIG. 2 is a high level block diagram of the second embodiment of the present invention. In this embodiment, private application data is applied to an MPEG packetizer 232 which concatenates the private application data to a header (or headers) 302 having the fields shown in FIG. 3. Each of the packets generated by packetizer 232 is 188 bytes long as shown in FIG. 3. The packetized private application data is also provided with a unique PID number. This packetized private application data may be stored in a storage device (not shown) and is eventually provided to an output device (e.g., a buffer) 206 which stores a file of packets of private application data. The file of packets of private application data stored in the buffer 206 is made available to an MPEG stream server 202 via link 210. In an alternative embodiment, the private application data may be provided directly to the MPEG stream server 202 which packetizes the private application data internally.

As was the case with the first embodiment described above with reference to FIG. 1, in the second embodiment of the present invention, video and audio data are encoded (e.g., in accordance with the MPEG-2 standard) with a video encoder 234 and an audio encoder 238, respectively. The encoded video and audio data are provided to packetizers 236 and 240, respectively.

A preprocessor (not shown) may be provided to prepare a PID map table which indicates the number of "elementary streams" to be included in the transport stream. The PID map in an identified packet defines PID numbers for identifying the type of data (e.g., audio, video, or private application) stored in the payloads of packets.

The packetized MPEG encoded audio and video data may be stored in storage device (not shown) and retrieved as files of packets of MPEG encoded audio and video data. Such files are shown as being stored in output devices (e.g., buffers) 242 and 204, respectively. The file(s) of packets of MPEG video stored in the buffer 104 is provided to the MPEG stream server 202 via link 208 while the file(s) of packets of MPEG audio stored in buffers 242 are provided to the MPEG stream server 202 via link 244.

Figure 6:
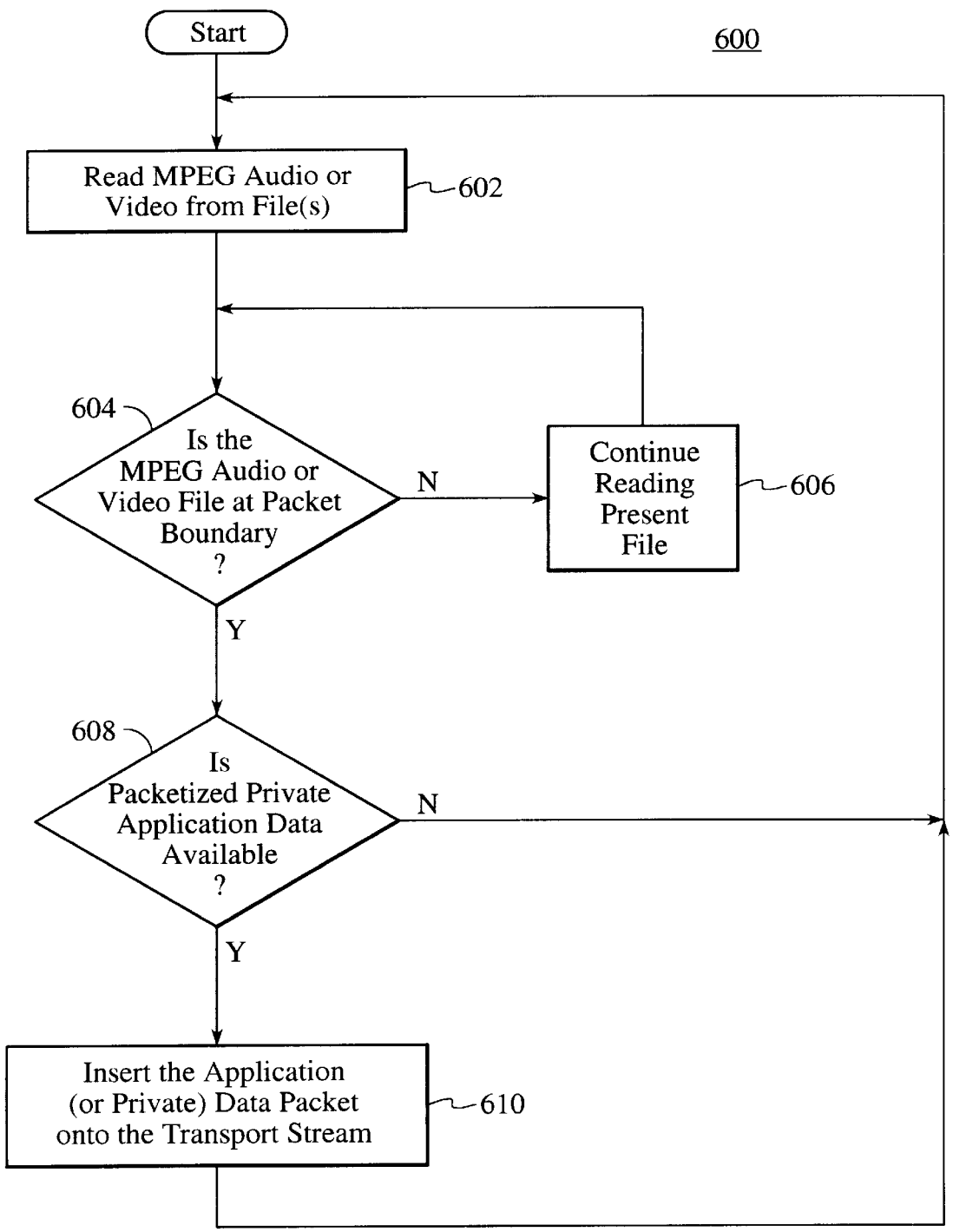
FIG. 6 is a flow diagram illustrating the operation of the MPEG stream server of the second embodiment of the present invention.
Figure 7:
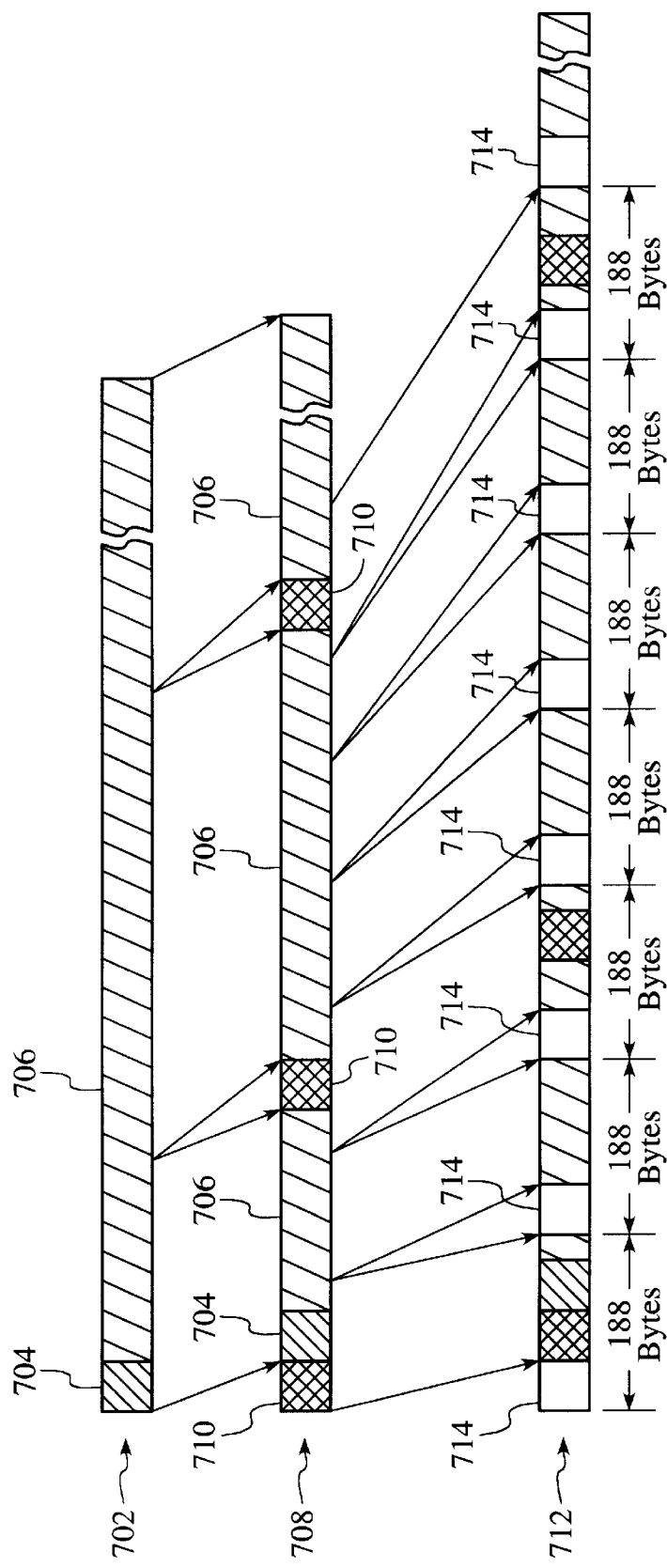
FIG. 7 is a pictorial representation of the packetizing of compressed video data into a stream of PES packets and a stream of transport packets.
Figure 8:
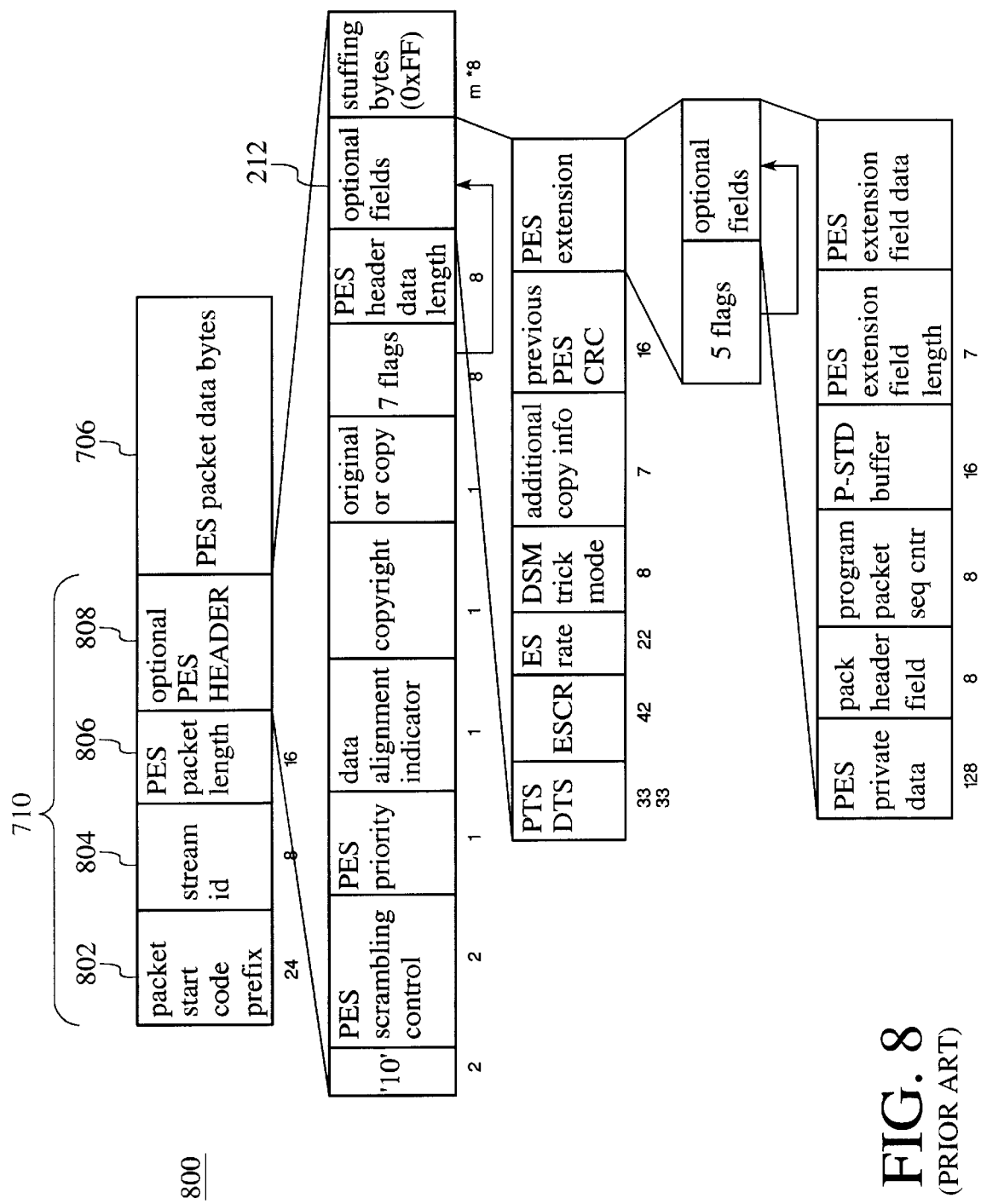
FIG. 8 is a pictorial representation of the syntax of a PES packet.

FIG. 6 is a flow diagram of the operation of the MPEG stream server 202 of the second embodiment of the present invention. The operation of the MPEG stream server 202 is described with respect to FIG. 6 below. First, as shown in step 602, the MPEG stream server 202 reads in either MPEG audio data from the file(s) provided at link 244 or MPEG video data from the file(s) provided at link 208. Next, as shown in step 604, whether the MPEG audio or video file is at a packet end boundary (i.e., at the end of a packet) is determined. Specifically, as discussed above, the start of a packet in the transport stream syntax is indicated by an eight (8) bit sync byte 306. As mentioned in the background section, the sync byte 306 has a value of "01000111" and identifies the start of a 188 byte packet. Since the length of a packet having the transport stream syntax is always 188 bytes, the end of the packet is 187 bytes from the end of the sync byte 306.

If the file is not at a packet boundary, the reading of the file by the MPEG stream server 202 continues as shown in step 606. If, on the other hand, the file is at a packet boundary, whether packetized private application data is available at link 210 is determined in step 608. If packetized private application data is not available at link 210, the MPEG stream server 202 reads more of the MPEG audio and/or video files. (See steps 608 and 602.) If, on the other hand, packetized private application data is available at link 210, packet(s) of the private application data is (are) inserted onto the transport stream as shown in step 610.

Thus, at determined packet boundaries of video and/or audio MPEG data, packets of private application data are inserted as available. However, the MPEG stream server 202 must be certain that enough audio and/or video MPEG data is inserted into the transport stream such that the MPEG audio and/or video decoders 246 and/or 216, respectively, located at a far end of communications link 212 do not run out of data. Thus, the MPEG stream server may limit the amount of private application data packets with respect to audio and/or video MPEG data packets, for example, to a predetermined packet ratio. The predetermined packet ratio may depend, for example, on the buffer sizes provided for the MPEG audio and video decoders and on the relative time required to process the private application data, to decode and process the audio data, and to decode and process the video data.

As the MPEG stream server 202 creates the transport stream, the transport stream is communicated to the far end of the link 212. The MPEG stream server 202 may be a work station (executing a program) and the link 212 may support the SCSI-2 fast and wide protocol, as discussed above with respect to the first embodiment of the present invention.

At the far end of the link 212, an MPEG transport demultiplexer 214:

(i) separates the MPEG audio, MPEG video, and private application data packets from the transport stream based on the contents of the PID field 314 of each stream;

(ii) sends the private data to a private application processor 218 via link 224;

(iii) sends the MPEG video data to an MPEG video decoder 216 via link 222; and (iv) sends the MPEG audio data to an MPEG audio decoder 246, via link 248.

The private data application processor 218 may process the private data into, for example, graphic and/or textural overlays for associated MPEG video or gaming data. The MPEG video decoder 216 provides a first video signal to a first input of a video combination device 220 via line 226. This video data may be encoded into NTSC (National Television Standards Committee) format for example before it is provided to the video combination device 220. The private application processor 218 may provide a second video signal such as a textural overlay, to a second input of the video combination device 220 via line 228. The video combination device 220 combines the video signals applied to its first and second inputs to form a composite video signal. The composite video signal output by the video combination device 220 is then modulated with a carrier frequency and combined with other video channels onto a broadband video distribution network, for example.

Although the private application has been described as generating video and/or textural overlays, the private application may be unrelated to the video and audio data, except for the fact that it is being transferred from the same source location as the video and audio data, to the same destination location as the video and audio data.

The second embodiment of the present invention has several advantages over the first embodiment.

First, in the second embodiment of the present invention, more than one type of private application data can be packetized and inserted onto the transport stream by the MPEG stream server 202. In such an embodiment, each type of private application data will have a unique PID number. The MPEG transport demultiplexer 214 will separate the different types of private application data and provide them to corresponding private applications.

Further, since the second embodiment of the present invention does not insert the private application data into the header of MPEG audio or video packets, the private application data is not transmitted within a further layer of encapsulation. This permits the MPEG stream server 202 to insert the private application data without the degree of packet decoding required in the first embodiment. This is particularly true if the PID map is set at the time of encoding. That is, the MPEG stream server 202 can go to the 188 byte packet boundaries without decoding the packets. Eliminating the further layer of encapsulation similarly reduces the processing required by the MPEG transport demultiplexer 214. That is, the MPEG transport demultiplexer 214 need only look at the PID numbers of the packets; it does not have to look within MPEG audio and video packets for extracting private application data. However, synchronization between the MPEG video and private application data is not inherent, as it was in the first embodiment of the present invention.

To reiterate, in each of the above embodiments, the private application data was used to generate a video signal to be combined with the decoded MPEG video. However, other types of private application data, such as non-video data for example, can be processed by private application processor(s) at the far end of the communications link 112/212.

What is claimed is:

1. A method for communicating private application data, along with audio and video data, from a source location to a destination location, the method comprising the steps of:

encoding the audio data in accordance with an audio compression algorithm to produce encoded audio data;

encoding video data in accordance with a video compression algorithm to produce encoded video data;

packetizing the encoded audio data to produce packets of encoded audio data, each of the packets of encoded audio data having a header portion and a payload portion, each header portion of the audio packets accommodating private application data;

packetizing the encoded video data to produce packets of encoded video data, each of the packets of encoded video data having a header portion and a payload portion, each header portion of the video packets accommodating private application data;

establishing fixed private application areas based upon a maximum bandwidth anticipated for the private application data in the header portions of the encoded audio packets and video packets;

inserting the private application data into said private application areas of the headers of the packets of encoded audio data and encoded video data to produce stuffed audio and video packets;

multiplexing the stuffed audio and video packets to form a packet stream; and transmitting the packet stream from the source location to the destination location.

2. The method of claim 1 further comprising steps of:

extracting private application data from the stuffed audio and video packets of the transmitted packet stream;

demultiplexing the transmitted packet stream to separate the packets of encoded audio data from the packets of encoded video data;

decoding the payload portion of the packets of audio encoded data to form audio data; and decoding the payload portion of the packets of encoded video data to form video data.

3. The method of claim 2 further comprising a step of:

providing the extracted private application data to a private application process.

4. The method of claim 1:

wherein the step of encoding the audio data to produce encoded audio data further includes encoding audio data in accordance with the MPEG-2 standard; and wherein the step of encoding the video data to produce encoded video data further includes encoding video data in accordance with the MPEG-2 standard.

5. The method of claim 1 wherein the packet stream is an MPEG-2 transport stream.

6. The method of claim 3 further comprising steps of:

processing the private application data to form a screen overlay; and combining the screen overlay with the decoded video data.

7. A method for communicating private application data, along with audio and video data, from a source location to a destination location, the method comprising steps of:

encoding the audio data in accordance with an audio compression algorithm to produce encoded audio data;

encoding the video data in accordance with a video compression algorithm to produce encoded video data;

packetizing the encoded audio data to produce packets of encoded audio data, each of the packets of encoded audio data having a header which includes a first packet identification number;

packetizing the encoded video data to produce packets of encoded video data, each of the packets of encoded video data having a header which includes a second packet identification number;

packetizing the private application data to produce packets of private application data, each of the packets of private application data having a header which includes a third packet identification number;

multiplexing the packets of private application data, encoded audio data, and video data to produce a packet stream; and transmitting the packet stream from the source location to the destination location.

8. The method of claim 7 further comprising steps of:

demultiplexing the transmitted packet stream to separate the packets of encoded audio data, packets of encoded video data, and packets of private data;

decoding the payload data of the packets of encoded audio data to form audio data; and decoding the payload data of the packets of encoded video data to form audio data.

9. The method of claim 8 further comprising a step of:

providing the private application data located in the payload of the packets of private application data to a private application process.

10. The method of claim 7:

wherein the step of encoding the audio data to produce encoded audio data further includes encoding audio data in accordance with MPEG-2 standard; and wherein the step of encoding the video data to produce encoded video data further includes encoding video data in accordance with the MPEG-2 standard.

11. The method of claim 9 further comprising steps of:

processing the private application data to form a screen overlay; and combining the screen overlay with the decoded video data.

12. A device for communicating private application data, along with audio and video data, from a source location to a destination location, the device comprising:

a preprocessor having an input provided with private application data for establishing the maximum bandwidth anticipated for communicating the private application data and fixing a private application data area accordingly;

an audio encoder having an input accepting audio data and an output providing compressed audio data;

an audio packetizer, having an input coupled with the output of the audio encoder and an output providing packets of encoded audio data, each of the packets of encoded audio data having a header portion and a payload portion, each header portion accommodating private application data in accordance with the output of the preprocessor;

a video encoder having an input accepting video data and an output providing compressed video data;

a video packetizer, having an input coupled with the output of the video encoder and an output providing packets of encoded video data, each of the packets of encoded video data having a header portion and a payload portion, each header portion accommodating private application data in accordance with the output of the preprocessor;

a stream server having a first input coupled with the output of the audio packetizer, a second input coupled with the output of the video packetizer, a third input provided with the private application data, and an output, for inserting private application data provided at its first input into the headers of the packets of encoded audio data and of the packets of encoded video data to form stuffed audio and video packets, respectively, for multiplexing the stuffed audio and video packets to form a packet stream, and for providing the packet stream to its output; and a communication link, the communication link having a first end, at the source location, coupled with the output of the stream server, and a second end at the destination location.

13. The device of claim 12 further comprising:

a stream demultiplexer having an input coupled with the second end of the communications link, a first output, a second output, and a third output, for extracting private application data from the stuffed audio and video packets, for demultiplexing the packet stream to separate the packets of encoded audio data from the packets of encoded video data; and for providing the packets of encoded audio data to its first output, the packets of encoded video data to its second output, and the private application data to its third output;

an audio decoder having an input coupled with the first output of the stream demultiplexer, and an output, for providing audio data at its output;

a video decoder having an input coupled with the second output of the stream demultiplexer, and an output, for providing video data at its output; and a private application processor having an input coupled with the third output of the stream demultiplexer.

14. The device of claim 12:

wherein the audio encoder is an MPEG-2 audio encoder; and wherein the video encoder is an MPEG-2 video encoder.

15. The device of claim 12 wherein:

said packet stream formed by the stream server is an MPEG-2 transport stream.

16. The device of claim 13 wherein the private application processor has an output which provides private video screen data, the device further comprising:

a screen combining circuit having a first input coupled with the output of the video decoder, a second input coupled with the output of the private application processor, and an output, for providing a video screen including the video data and the private video screen data.

17. A device for communicating private application data, along with audio and video data, from a source location to a destination location, the device comprising:

an audio encoder having an input provided with audio data and an output, for encoding the audio data provided at its input in accordance with an audio compression algorithm to produce encoded audio data, and for providing the encoded audio data to its output;

a video encoder having an input provided with video data and an output, for encoding the video data at its input in accordance with a video compression algorithm to produce encoded video data, and for providing the encoded video data to its output;

a first packetizer having an input coupled with the output of the audio encoder and an output for producing packets of encoded audio data, each of the packets of encoded audio data having a header which includes a first packet identification number, and for providing the packets of encoded audio data to its output;

a second packetizer having an input coupled with the output of the video encoder and an output, for producing packets of encoded video data, each of the packets of encoded video data having a header which includes a second packet identification number, and for providing the packets of encoded data to its output;

a third packetizer having an input provided with the private application data, and an output; for packetizing the private application data provided at its input to produce packets of private application data, each of the packets of private application data having a header which includes a third packet identification number, and for providing the packets of private application data to its output;

a stream server having a first input coupled with the output of the first packetizer, a second input coupled with the output of the second packetizer, a third input coupled with the output of the third packetizer, and an output, for multiplexing the packets of private application data, encoded audio data, and encoded video data to produce a packet stream, and for providing the packet stream to its output; and a communication link having a first end, at the source location, coupled with the output of the stream server, and a second end at the destination location, and for transmitting the packet stream from the source location to the destination location.

18. The device of claim 17 further comprising:

a demultiplexer having an input coupled with the second end of the communications link, a first output, a second output, and a third output, for demultiplexing, based on the first, second, and third packet identification numbers, the transmitted packet stream to separate the packets of encoded audio data, packets of encoded video data, and a private data packets, and for providing the audio packets to its first output, the video packets to its second output, and the private data packets to its third output;

an audio decoder having an input coupled with the first output of the demultiplexer, and an output, for decoding the payload data of the packets of encoded audio data to form audio data, and for providing the audio data to its output; and a video decoder having an input coupled with the second output of the demultiplexer, and an output, for decoding the payload data of the packets of encoded video data to form video data, and for providing the video data to its output.

19. The device of claim 18 further comprising:

a private application processor having an input coupled with the third output of the demultiplexer whereby it receives private application data located in the payload of the private application data packet.

20. The device of claim 17 wherein the audio encoder is an MPEG-2 audio encoder and wherein the video encoder is an MPEG-2 video encoder.

21. The device of claim 19 further comprising:

a video combination circuit having a first input coupled with the output of the video decoder, a second input, and an output;

wherein the private application processor processes the private application data to from a screen overlay and provides the screen overlay to an output coupled with the second input of the video combination circuit; and wherein the video combination circuit combines the screen overlay provided at its second input with the video data provided at its first input.

* * * * *